UNITED STATES PATENT OFFICE.

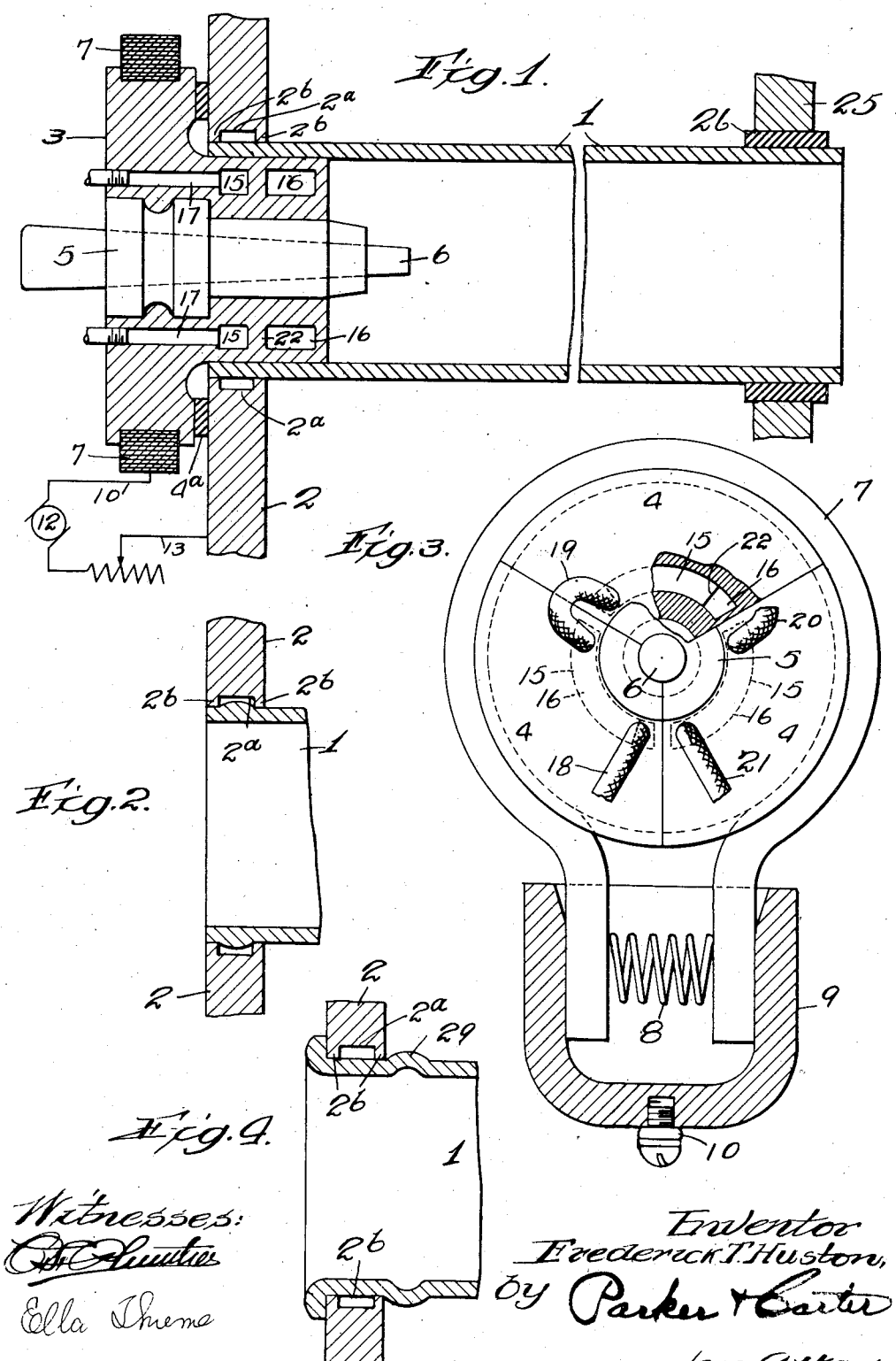

FREDERICK T. HUSTON, OF FORT WAYNE, INDIANA.

APPARATUS FOR ELECTRICALLY WELDING BOILER-TUBES TO FLUE-SHEETS THEREOF.

1,318,495.     Specification of Letters Patent.     Patented Oct. 14, 1919.

Application filed February 14, 1916, Serial No. 78,142. Renewed March 7, 1919. Serial No. 281,256.

*To all whom it may concern:*

Be it known that I, FREDERICK T. HUSTON, a citizen of the United States, residing at Fort Wayne, in the State of Indiana, have invented a certain new and useful Improvement in Apparatus for Electrically Welding Boiler-Tubes to Flue-Sheets Thereof, of which the following is a specification.

This invention relates to a new and improved apparatus for electrically welding boiler tubes to the flue sheets thereof, and has for its object to provide a new and improved device of this description.

The invention is illustrated in the accompanying drawings, wherein—

Figure 1 is a sectional view through a boiler tube and a portion of the two flue sheets with the welding terminal in position and before the welding has been completed;

Fig. 2 is a sectional view through the end of the boiler tube and a portion of the flue sheet after the welding has been completed;

Fig. 3 is an end view of the welding terminal;

Fig. 4 is a view similar to Fig. 2, showing a modified construction.

Like numerals refer to like parts throughout the several figures.

In the drawings I have shown one form of apparatus for carrying out my process. In this construction the end of the boiler tube 1 is inserted in the opening in the flue sheet 2, the end face of the tube being preferably flush with the face of the flue sheet. In the end of the boiler tube 1 I insert an extensible or expansible electrical terminal 3 which is preferably of copper. As illustrated in Fig. 3, this terminal is made up of a plurality of sections 4, with means for forcing them outwardly so as to provide the desired pressure between the terminal and the inner face of the tube 1. This is accomplished by means of a steel expander located between these sections and consisting of the outer expansible part 5 preferably made in sections, which engages the sections 4 and which has a tapered hole therethrough, there being a tapered pin 6 in said hole, which when driven in, expands the sections 4 so as to tightly press them against the inner face of the tube 1. The terminal is provided at its periphery with a flexible device 7, preferably made up of a series of strips of metal, such as copper, and through which the current is conducted to the terminal, the flexibility of the device permitting the terminal to expand as hereinbefore set out. The flexible conducting device 7 is preferably located in a groove in the terminal and is tightly pressed against the terminal in any desired manner, as by means of a spring 8. This flexible conducting device is connected in circuit with a source of current supply 12 by the conducting piece 9 and the conductor 10. The other terminal of the source of current supply 12 is connected by a conductor 13 with the flue sheet 2, there being a suitable current controlling device in the circuit. It will be noted that the cross sectional area of the boiler tube is less than the cross sectional area of the flue sheet, and I therefore provide some means for equalizing this cross sectional area at the point of contact, thus permitting the boiler tube and the flue sheet to be brought to substantially the same heat at substantially the same time, thereby insuring the proper weld. This equalizing of the cross sectional area may be secured in any desired manner. In the particular construction shown I secure it by removing some of the metal of the flue sheet by providing a groove 2ª extending entirely therearound, thus forming the projections 2ᵇ, which engage the boiler tube. This construction also secures an additional strengthening effect, as hereinafter described. The electrical terminal 3 is preferably arranged so as to properly take care of the heat, thus preventing it from becoming overheated. Any suitable means for this purpose may be used. Under ordinary conditions the terminal itself will be able to take care of the heat on account of its size. I prefer, however, to provide some cooling means for this terminal. In the construction shown, I provide means for circulating a cooling liquid through the terminal. This may be done by providing passageways 15 and 16 in the terminal, that is, in the different sections of the terminal that project into the boiler tube, this being the point where the greatest heat is developed. These passageways are then connected by other passageways 17, through which the liquid flows to and from them. In view of the fact that the sections of the terminal are separated from each other, the cooling liquid may pass in the one section 4 through the pipe 18, and then pass from said section to the next section, through the pipe 19, and from said latter section to the next section through the pipe 20, and then out through the pipe 21, thus forming a circulatory system whereby the cooling liquid is circulated through the terminal. In view of the fact that pressure is applied to the terminal, I prefer to have the passageways 15 and 16 separated by a wall or ribs 22. It will thus be seen that by means of this process a practically uniform pressure is secured throughout the entire inner surface of the boiler tube, and that a practically uniform pressure is also secured between the outer face of the boiler tube and the flue sheet, thus insuring the welding of the boiler tube to the flue sheet all the way around, and providing an absolute water-tight joint. When the heat is turned on and the parts are in the position shown in Fig. 2 and the metal is brought to the proper temperature, the pin 6 is driven into the expander, thus uniformly expanding the terminal and also uniformly expanding the end of the boiler tube, causing it to be welded to the flue sheet. At the same time a portion of the metal is forced outwardly into the groove 2ª in the flue sheet, thus acting as a lock to greatly strengthen the joint and prevent the tube from being moved with relation to the flue sheet.

If it is desired to also weld the other ends of the boiler tubes to the other flue sheet 25, another electric terminal is placed in the end of the boiler tube and the current is simultaneously passed through both terminals so as to simultaneously weld both ends. Under ordinary conditions, however, it is only necessary to weld the ends of the boiler tubes nearest the fire-box, because these ends are subjected to very high temperatures, while the other ends are not subjected to these high temperatures. It is found in practice that with the method now generally used for connecting the ends of the boiler tubes with the flue sheets, the connection with the flue sheet near the fire-box is the one that gives trouble, due to these high temperatures, and these connections at the fire-box end require continual repairing, all of which are avoided by the present process and construction. If it is only desired to weld the ends of the boiler tubes nearest the fire-box to the flue sheet, the other ends of the tubes are provided with insulating bushings 26 (see Fig. 1), so as to confine the current to one end of the tube. After the welding has been completed these insulating bushings are removed and replaced by metal bushings made of copper or other proper material, and these ends of the tubes are then rolled in the ordinary way to fasten them to the flue sheets.

In Fig. 4 I have shown the boiler tube with the end 28 rolled over so as to form a bead which engages the face of the flue sheet, there being a projecting part 29 which engages the other side of the flue sheet. I prefer, however, to make the end of the boiler tube flush with the flue sheet, as shown in Fig. 1, because excessive heat in the fire-box burns the end when formed into a bead, as shown in Fig. 4. The part 29 may also be omitted, because the portion of the tube which is forced into the groove 2ª acts as a lock to take the strain from the welded joint and prevent lateral movement of the tube with relation to the flue sheet. The pipes 18, 19 and 20 are arranged so as to permit the spreading out of the sections 4, and are preferably flexible pipes of any suitable construction. I also provide an insulator 4ª between the sections 4 of the electric terminal and the flue sheet, which is engaged by the sections 4 when the terminal is in its maximum position, thus acting as a stop and at the same time preventing the current from passing to the flue sheet except by way of the boiler tube. The sections 4 have the axial parts which enter the tube and the lateral projecting parts which engage the insulating piece 4ª, a portion of the metal between these two parts being preferably cut away as shown. This cut-away portion is particularly adapted for use when the ends of the boiler tubes are provided with beads as shown in Fig. 4.

It will be noted that in the present case it is not necessary to cut away any portion of either face of the flue sheet, the flue sheet in each instance having smooth faces without cuts or recesses of any kind therein which would weaken them. And it is further noted that the weld between the boiler tube and the flue sheet is made between these two smooth uncut or unrecessed walls of the flue sheet, and that that portion of the tube between these two walls is the portion of the tube that is expanded during the process of forming the weld.

I claim:

1. A device for electrically welding boiler tubes to the flue sheets thereof, comprising an electric terminal adapted to be inserted in the end of the boiler tube, means for passing the current through said electrical terminal and through the end of the boiler tube and the flue sheet, and means for expanding the electrical terminal when the tube has been properly heated so as to expand the end of the tube and weld it to the flue sheet.

2. A device for electrically welding boiler tubes to the flue sheets thereof, comprising an electric terminal adapted to be inserted in the end of the boiler tube, said terminal consisting of a plurality of sections adapted to engage the inner face of the boiler tube, an expanding device associated with said sections and adapted to force them outwardly against the inner face of the boiler tube without interfering with their electrical connection.

3. A device for electrically welding boiler tubes to the flue sheets thereof, comprising an electric terminal adapted to be inserted in the end of the boiler tube, said terminal consisting of a plurality of sections adapted to engage the inner face of the boiler tube, an expanding device associated with said sections and adapted to force them outwardly against the inner face of the boiler tube, and means for cooling said several sections when the device is in operation.

4. A device for electrically welding boiler tubes to the flue sheets thereof, comprising an electrical terminal adapted to be inserted in the end of the boiler tube, said terminal consisting of a plurality of separated current conducting sections adapted to engage the inner face of the boiler tube, a centrally located expanding device having a plurality of sections adapted to engage the current conducting sections, and a tapered pin engaging the sections of the expanding device and adapted when moved to a pre-determined position, to force them outwardly and force the current conducting sections against the inner face of the boiler tube.

5. A device for electrically welding boiler tubes to the flue sheets thereof, comprising an electrical terminal having a series of separated current conducting sections, each of said sections having two portions, an axial portion adapted to be inserted in the end of the boiler tube, and a laterally projecting portion projecting along the face of the flue sheet, an expanding device associated with said axial portions and adapted when operated, to separate them and force them tightly against the inner face of the boiler tube.

6. A device for electrically welding boiler tubes to the flue sheets thereof, comprising an electrical terminal having a series of separated current conducting sections, each of said sections having two portions, an axial portion adapted to be inserted in the end of the boiler tube, and a laterally projecting portion projecting along the face of the flue sheet, an expanding device associated with said axial portions and adapted when operated, to separate them and force them tightly against the inner face of the boiler tube, and an insulating stop between the laterally projecting portions of the current conducting sections and the flue sheet of the boiler.

7. A device for electrically welding boiler tubes to the flue sheets thereof, comprising an electrical terminal adapted to be inserted in the end of the boiler tube, said terminal consisting of a plurality of sections adapted to engage the inner face of the boiler tube, an expanding device associated with said sections and adapted to force them outwardly against the inner face of the boiler tube, and a flexible current conducting device which engages said sections and holds them together and at the same time permits them to expand without interfering with the supply of current thereto.

In testimony whereof, I affix my signature in the presence of two witnesses this 22nd day of January, 1916.

FREDERICK T. HUSTON.

Witnesses:
   ESTHER VAN FRANK,
   ELLA THIEME.